United States Patent

Halstead

[15] 3,688,393

[45] Sept. 5, 1972

[54] METHOD AND DEVICE FOR STRAIGHTENING AND ALIGNING LEADS OF A MODULE INSERTABLE IN A CIRCUIT BOARD

[72] Inventor: William M. Halstead, P. O. Box 881, Glen Burnie, Md. 21061

[22] Filed: Sept. 17, 1970

[21] Appl. No.: 73,124

Related U.S. Application Data

[63] Continuation-in-part of Ser. No. 12,673, Feb. 19, 1970, Pat. No. 3,628,244.

[52] U.S. Cl. ..................29/626, 29/203 H, 29/203 P

[51] Int. Cl. ..........................H05k 3/30, H05k 13/04

[58] Field of Search .....29/626, 203 H, 203 B, 203 P, 29/203 R

[56] References Cited

UNITED STATES PATENTS 3,538,580 10/1970 Bruner.....................29/203 H 3,602,971 9/1971 Halstead..................29/203 H 3,628,244 12/1971 Halstead..................29/203 H

*Primary Examiner*—Thomas H. Eager

*Attorney*—Munson H. Lane and Munson H. Lane, Jr.

[57] ABSTRACT

The two rows of terminal leads of an electrical module are inserted into a pair of parallel slots formed within a body of a device. A pair of notched jaws disposed at opposing sides of the body are moved towards each other for engaging each lead within a respective notch of the jaws. The module is then pulled from the slots in a direction longitudinal to the leads while maintaining engagement of the leads by the notches. In this way, the leads are straightened and aligned. A tool may be used having a slotted head into which the module is applied. The tool with the module thereon is then inserted into the parallel slots of the head.

10 Claims, 14 Drawing Figures

INVENTOR
William M. Halstead

BY Munson H. Lane
ATTORNEY

INVENTOR
WILLIAM M. HALSTEAD
BY Munson H. Lane
ATTORNEY

METHOD AND DEVICE FOR STRAIGHTENING AND ALIGNING LEADS OF A MODULE INSERTABLE IN A CIRCUIT BOARD

This application is a continuation-in-part of my copending application Ser. No. 12,673, filed Feb. 19, 1970 now U.S. Pat. No. 3,628,244, granted Dec. 21, 1971.

This invention relates to new and useful improvements in special devices and methods for use with electrical components such as integrated circuit flat pack modules which are provided with parallel rows of terminal leads for insertion in apertures of a circuit board.

A module of this type may have two rows of leads with seven or 12 leads in each row, and expeditious installation of the module on a circuit board can be effected only if all the leads are straight and properly aligned for simultaneous insertion in the apertures of the board. It often happens that one or more of the leads become bent during storage or handling of the module, and must be straightened before the module can be installed. Individual straightening of each bent lead is a tedious task and often it is difficult to correctly align a bent lead with respect to the others, especially when some of the adjacent leads are also bent and therefore cannot be relied upon to provide an accurate guide as to proper alignment.

It is, therefore, the principal object of the invention to facilitate easy and expeditious straightening of any bent leads of a module by the use of a simple device and method for straightening and aligning the two rows of terminal leads of an electrical module prior to insertion in apertures of a circuit board.

The lead straightening and aligning device of the present invention is a part of a family of special tools which I have designed for working with integrated circuit modules, as disclosed for example in my following patent applications:

- Tool for Removing and Replacing Integrated Circuit Flat Pack Modules, Ser. No. 778,440, filed Nov. 25, 1968, now U.S. Pat. No. 3,602,971, granted Sept. 7, 1971.
- Handling and Heat Dissipating Device for Electrical Components, Ser. No. 849,831, filed Aug. 13, 1969;
- Electrical Component Desoldering and Extracting Tool, Ser. No. 862,166, filed Sept. 30, 1969; now U.S. Pat. No. 3,632,036, granted Jan. 4, 1972 and
- Module Installing Tool with Lead Straightening Means, Ser. No. 12,673, filed Feb. 19, 1970 now U.S. Pat. No. 3,628,244, granted Dec. 21, 1971.

As are the others, the tool of the present invention is simple in construction, efficient and dependable in operation, and lends itself to economical manufacture.

With the foregoing more important object and features in view and such other objects which may become apparent as this specification proceeds, the invention will be understood from the following description taken in conjunction with the accompanying drawings, wherein like characters of reference are used to designate like parts, and wherein.

Figures 1, 2, 3, 4, 5, 6, 7, 8, 9:
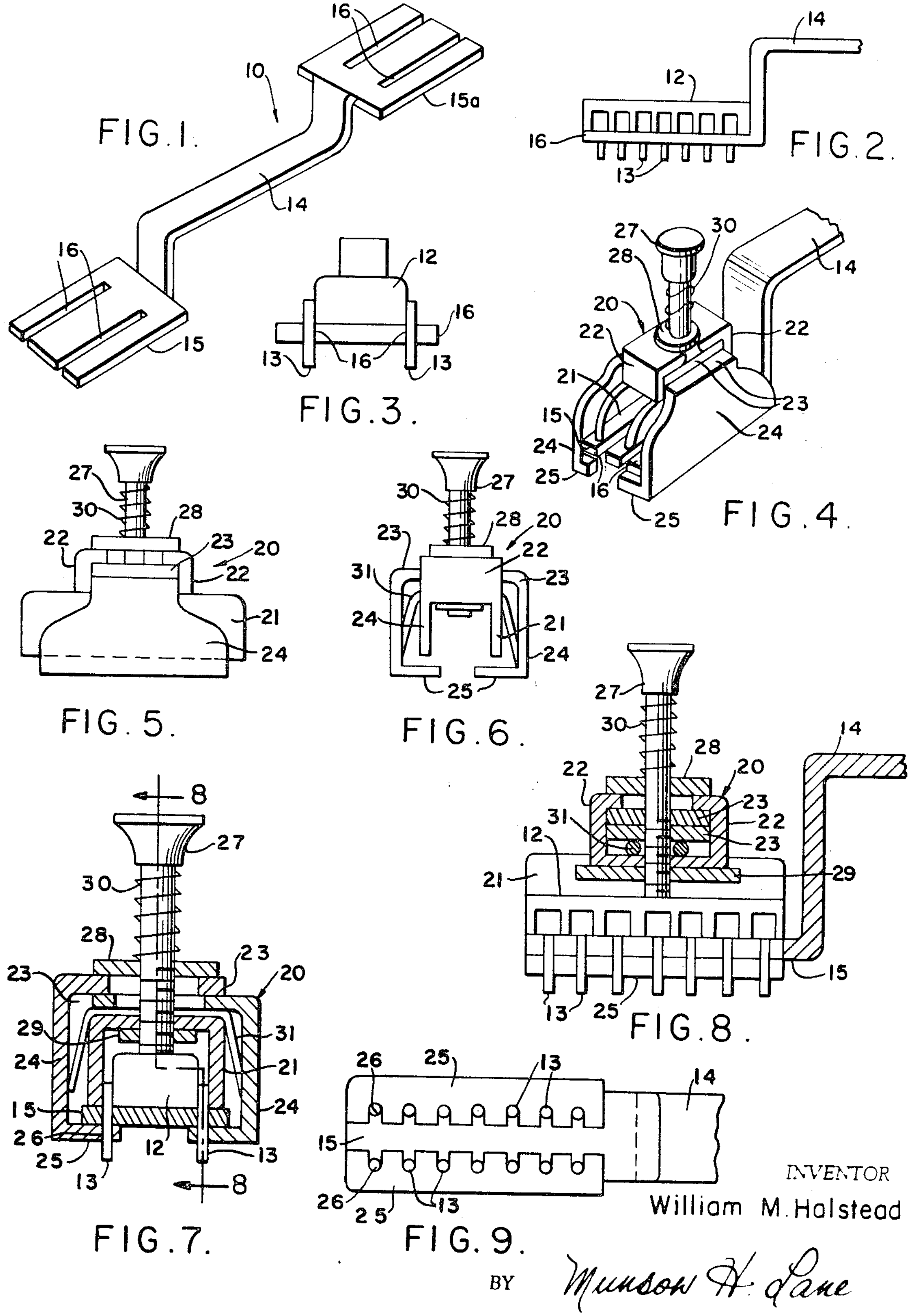
FIG. 1 is a perspective view of the tool with selectively usable heads at opposite ends of its handle.
FIG. 2 is a fragmentary side elevational view showing a module in position on one of the heads.
FIG. 3 is an end view of the subject shown in FIGS. 2.
FIG. 4 is a fragmentary perspective view of a straightening attachment in position on one of the heads.
FIG. 5 is a side elevational view of the attachment per se.
FIG. 6 is an end elevational view of the attachment.
FIG. 7 is a vertical cross-sectional view showing a module and the attachment on one of the heads.
FIG. 8 is a fragmentary longitudinal sectional view, taken substantially in the plane of the line8—8 in FIG. 7.
FIG. 9 is an underside plan view of the subject shown in FIG. 8.

Referring now to the accompanying drawings in detail, more particularly to FIGS. 1–3 inclusive, the module installing and lead straightening tool of the invention is designated generally by the numeral 10 and is intended for use with an integrated circuit module 12 having two parallel rows of terminal leads 13 projecting downwardly therefrom, it being understood that these leads must be straight and properly aligned before the module can be installed on a circuit board by inserting all the leads simultaneously into apertures with which the board is provided.

The tool 10 comprises a handle 14 provided at its opposite ends with a pair of selectively usable plate-shaped heads 15, 15*a*, each head being formed with a pair of slots 16 which are parallel and open at the end of the head remote from the handle. The two heads 15, 15*a* are identical in construction but are of different sizes, so that the head 15, for example, may accommodate a module having two rows of leads with seven leads in each row, while the head 15*a* may accommodate a larger module having, for example, two rows of leads with twelve leads in each row.

The transverse spacing of the slots 16 in each head corresponds to the transverse spacing of the two rows of leads 13 of the module which is to be accommodated on that head, and the width of each slot corresponds to the thickness of the leads.

When the module is picked up for installation, some of its leads may be bent in a transverse direction, that is, out of longitudinal alignment in each row, as for example, when a lead in one row is bent transversely toward the leads in the other row. Also, the leads may be bent in a longitudinal direction, that is, in the plane of the row itself, as for example, when a lead in a row is bent longitudinally toward the next lead in the same row. The first mentioned bent lead condition is straightened out when the module is applied to the tool head, for example the head 15, by longitudinal movement parallel to the direction of the slots 16 so that the two rows of leads 13 enter the open end of the two slots and slide inwardly in the slots until the full length of the module is accommodated on the head 15 as shown in FIGS. 2 and 3. During this sliding application of the module to the toolhead, any transversely bent leads of the module will be straightened into longitudinal alignment of their respective rows, and the module is ultimately seated in position by pressing it downwardly against the upper surface of the head while the leads project downwardly below the lower surface of the head, as illustrated.

Assuming that the module leads, after being straightened and longitudinally aligned by application of the module to the head 15 as above described, are also initially straight in the plane of their respective rows, the module may then be installed on a printed circuit board while in position on the head 15 and manipulated by the handle 14, which is preferably upwardly offset from the head as shown in FIG. 1 so that it may be conveniently grasped without interfering with the circuit board itself while the head with the module thereon is closely adjacent to the board.

After the projecting leads of the module are inserted in the board apertures, the tool may be withdrawn and the module pressed further against the board, if necessary.

While the aforementioned lead straightening procedure takes care of leads which have been bent in a transverse direction, that is from one row toward the other, it does not provide for straightening of leads which have been bent in the longitudinal direction, that is, toward the next lead in the same row. For this purpose the tool of the invention includes an attachment designated generally by the numeral 20 which is shown in FIGS. 4–9 and, in one of its uses, is applicable to the tool head 15 after the module is in position on the head, as already described.

The attachment 20 comprises an elongated, inverted U-shaped body 21 which is adapted to receive the module 12 therein while engaging the upper surface of the head 15 outside of the slots 16, as shown in FIG. 7. The top of the body 21 is provided with a pair of longitudinally opposing brackets 22 which act as a holder for slotted, superposed upper portions 23 of a pair of jaws 24. The jaws 24 are disposed exteriorly at opposite sides of the body 21 and have inturned, opposing lower portions 25 formed with notches 26. The inturned jaw portions 25 are located below the head 15 and the notches 26 are adapted to receive the downwardly projecting leads 13 of the module. The longitudinal spacing of the notches 26 of each jaw corresponds to the correct longitudinal spacing of the leads 13 in each row, and the notches in the two jaws are transversely aligned so that when the attachment 20 is applied to a module held on the head 15 of the tool 10, the leads of the module are straightened into parallelism with each other in the respective rows.

The jaws 24 are held assembled on the body 21 by a clamping screw 27 which passes freely through a washer 28 positioned on top of the brackets 22, then through the slotted jaw portion 23, then through an aperture in the top of the body 21, and then is screw-threaded into a plate-shaped nut 29 inside the body 21. A compression spring 30 is positioned on the screw 27 between the screw head and the washer 28 in order to take up slack, it being noted that the jaws 24 are movably assembled on the body 21 by virtue of the slotted jaw portions 23 through which the screw 27 freely extends, thus making it possible for the two jaws to move transversely toward and away from each other while the attachment is being applied to or removed from the module on the associated supporting head 15. A leaf spring 31 is provided as shown in FIG. 7 to normally bias the two jaws apart.

In use, the attachment 20 is applied so as to slide longitudinally over the module on the head 15, and the jaws 24 are manually pressed together, against the action of the spring 31, so that the module leads 13 are received in the notches 26 of the jaws and are thereby properly aligned. The screw 27 may then be tightened to hold the module 12 pressed against the head 15 while at the same time locking the jaws 24 in their drawn together position, whereupon the entire tool may be manipulated so as to insert the leads of the module into the circuit board apertures. The tool 10 and the attachment 20 may then be withdrawn from the module, after loosening of the screw 27.

Although the attachment 20 is primarily intended to be used in conjunction with the tool 10 as already described, the attachment may also be used by itself, that is, without the tool 10, by simply inserting the module into the attachment and engaging the notched jaws 24 with the leads of the module. In this manner some straightening action of the leads will be effected and, upon tightening of the screw 27, the entire attachment will serve as a handle for placing the module in position on the circuit board.

Reference is now drawn to FIGS. 10–13 which show a modified embodiment of the module lead straightening appliance. The modified embodiment is designated generally by the reference numeral 35 and the module 12, supported on the head 15 of the tool 10, may be applied to the appliance 35 instead of applying the attachment 20 to the tool 10 as already described.

Figure 13:
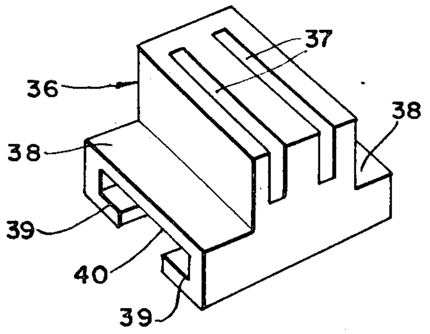
FIG. 13 is a perspective view of the block.

The appliance 35 comprises an elongated block or body 36, the upper portion of which is provided with a pair of spaced parallel slots 37 open at one end thereof for slidably receiving the two rows of module leads 13. The lower portion of the block 36 is widened laterally to both sides of the block as indicated at 38 (see FIG. 13) and the ends of the widened portion are provided with inturned opposing flanges 39 defining an open-ended channel 40 at the underside of the block, it being noted that the channel extends transversely of the block, as is best shown in FIG. 13.

The channel 40 provides guide means for sliding movement of a pair of jaws 41, 42 which are located at the opposite sides of the block 36 and are movable transversely of the block toward and away from each other. The jaw 41 is provided at the bottom thereof with a plate portion 43 which is slidably received between a pair of strip portions 44 provided at the bottom of the jaw 42, as will be apparent from FIG. 12. The portions 43, 44 are slidably received in the aforementioned channel 40, thus holding the jaws 41, 42 and the block 36 assembled while permitting movement of the jaws toward and away from each other, transversely of the block. At the top, the jaws 41, 42 are provided with opposing inturned portions 45, 46 disposed in a plane immediately above the top surface of the block 36 and equipped with transversely aligned notches 47, adapted to receive the module leads 13 which have been inserted in the slots 37 of the block. The jaws 41, 42 are biased apart by a pair of compression springs 48 reacting between the jaws and the opposite sides of the block.

Figures 10, 11:
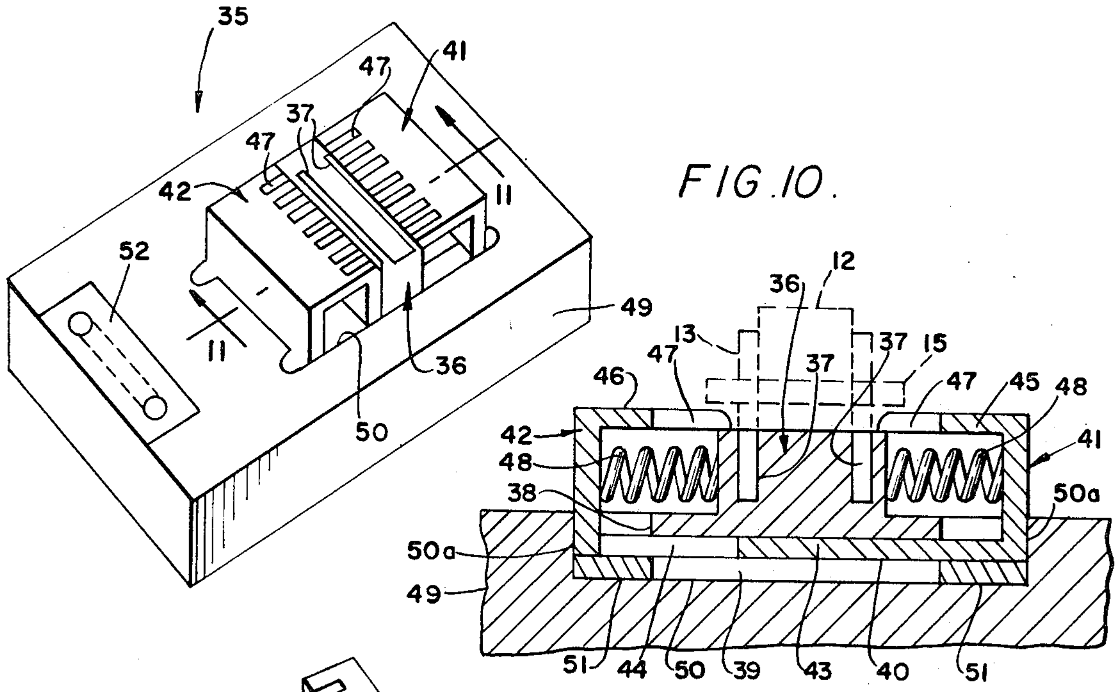
FIG. 10 is a perspective view of a modified embodiment of the lead straightening appliance.
FIG. 11 is an enlarged, fragmentary sectional view, taken substantially in the plane of the line 11—11 in FIG. 10.
Figure 12:
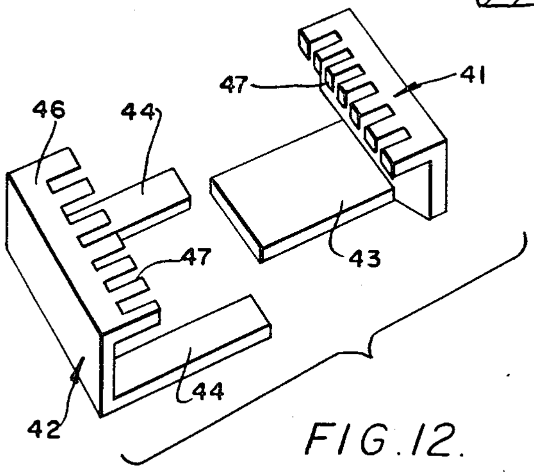
FIG. 12 is a group perspective view of the jaws used in the embodiment of FIG. 10.

Preferably, the block 36 with the jaws 41, 42 is mounted on a supporting base 49 formed in the top thereof with a recess 50 to accommodate the block and the jaws. The recess 50 is dimensioned so as to permit the jaws 41, 42 to move apart up to a limit which is reached when the jaws come into abutment with the opposite side edges *50a* of the recess, as shown in FIG. 11. In this position the notched portions 45, 46 of the jaws have cleared the slots 37 in the block 36. A pair of filler strips 51 are provided on the bottom of the recess 50 in the base 49 at the opposite sides of the wide lower portion 38 of the block 36, thus holding the block in its proper position in the recess and affording clearance in the recess for outward sliding of the jaws.

In operation, the module 12, held on the head 15 of the tool 10, is applied to the appliance 35 by inserting the downwardly projecting leads 13 of the module into the slots 37 in the block 36 while the jaws 41, 42 are separated by action of the springs 48. This aligns the module leads in the longitudinal direction, that is, in their respective rows. The jaws 41, 42 are then pressed toward each other against the action of the springs 48, and this causes the notches 47 in the jaw portions 45, 46 to engage the module leads and to thus align them in the transverse direction, in much the same manner as when the aforementioned attachment 20 is utilized instead of the appliance 35.

Conveniently, an appropriately apertured test plate 52 may be screwed or otherwise secured to the base 49, so that after the module leads have been straightened and aligned as already explained, the module supported by the tool 10 may be removed from the appliance 35 and the module leads inserted in the apertures of the plate 52 for testing the accuracy of their alignment prior to installation of the module on a circuit board.

Figure 14:
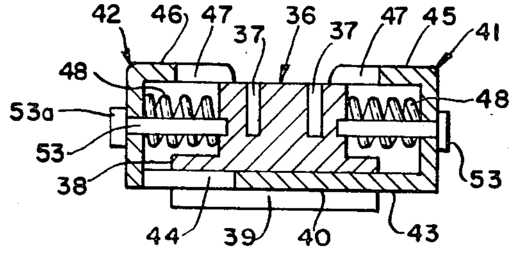
FIG. 14 is a sectional view similar to that in FIG. 11, but showing another modification.

The base-mounted appliance 35 as shown in FIGS. 10 and 11 may be used as such by placing the same on a table or work bench. However, the appliance may be hand-held, in which event the base 49 may be omitted and the appliance modified as shown in FIG. 14. There, the structural arrangement of the slotted block and movable jaws is the same as already described, but a pair of posts 53 are secured to and project laterally from the opposite sides of the block 36 through the springs 48, the posts 53 passing slidably through the jaws 41, 42 and terminating at their outer ends in enlarged heads 53a. These heads serve as stops to limit the outward sliding movement of the jaws and the posts 53 themselves serve to retain the springs 48 against possible displacement.

While in the foregoing there have been described and shown the preferred embodiments of the invention, various modifications and equivalents may be resorted to within the spirit and scope of the invention as claimed.

What is claimed as new is:

1. A method of straightening and aligning two rows of terminal leads of an electrical module which are insertable in apertures of a circuit board, said method comprising the steps of inserting the two rows of leads into a pair of parallel slots formed within a body of a device, moving a pair of notched jaws disposed at opposing sides of said body towards each other for engaging each lead within a respective notch of the jaws, and pulling the module from the slots in a direction longitudinal to the leads while maintaining engagement of the leads by the notches until the leads are entirely removed from the slots thereby aligning the leads and straightening any of the leads that are bent.

2. The method of claim 1 in which in said moving step said notched jaws are disposed at opposing sides of and above said body.

3. The method of claim 1 in which there is provided the further step of applying the module to a tool having a slotted supporting head with the terminal leads inserted within the supporting slots, and applying the tool head with the module thereon and inserting the leads into the pair of parallel slots of the body.

4. A method of installing an electrical module on a circuit board in which the module has two rows of terminal leads which are insertable in apertures on the board and where the leads may require to be straightened or aligned before insertion, the method comprising the steps of applying the module to a tool having a supporting head with the terminal leads slideably inserted in the head with the leads aligned into coplanar relation in each row, applying the tool with the module thereon to a device having a slotted block and a pair of notched jaws at opposite sides and above the block movable toward and away from each other, inserting the terminal leads into the slots of the block, and moving the jaws toward each other to engage the module leads within the notches of the jaws.

5. A device for straightening and aligning two rows of terminal leads of an electrical module into transversely coplanar relation, the module being insertable in apertures of a circuit board comprising a body having formed in the top thereof a pair of parallel slots open at one end for slideably receiving the two rows of leads, a pair of jaws disposed at opposite sides of said body for movement transversely toward and away from each other, and said jaws having opposing portions above the body provided with lead receiving notches.

6. The device of claim 5 in which said body is block-shaped.

7. The device of claim 6 in which there is provided means for limiting sliding movement of said jaws away from each other and in which there is provided a supporting base having said block-shaped body mounted thereon.

8. The device of claim 5 in which there is provided resilient means for biasing said jaws apart.

9. The device of claim 5 in which there is provided clamping means for simultaneously locking said jaws in their drawn together position.

10. The device of claim 5 in which there is further provided a tool having a slotted supporting head for receiving the terminal leads within the supporting slots prior to inserting the leads into the parallel slots.

* * * * *